INVENTORS
MUNRO K. HAYNES
SAMUEL A. SCHMITT

BY Thomas & Crickenberger

ATTORNEYS

Feb. 1, 1966 M. K. HAYNES ETAL 3,233,222

CRYOTRON PERMUTATION MATRIX

Filed Sept. 25, 1961 4 Sheets-Sheet 3

CRYOTRON PERMUTATION MATRIX

Filed Sept. 25, 1961 4 Sheets-Sheet 4

3,233,222

CRYOTRON PERMUTATION MATRIX

Munro K. Haynes, Chappaqua, N.Y., and Samuel A. Schmitt, Princeton, N.J., assignors to International Business Machines Corporation, New York, N.Y., a corporation of New York Filed Sept. 25, 1961, Ser. No. 140,568
4 Claims. (Cl. 340—147)

This invention relates to switching matrices, and more particularly to superconductive matrices employing cryotron elements for permuting the input information.

In data processing systems the bits of information are usually handled in groups with the bits arranged in a predetermined sequence. It sometimes becomes necessary to rearrange the order of the information bits or to cause a selected bit to appear at a plurality of points in the system. In the present high speed data handling systems this rearranging must be accomplished without utilizing storage registers or other conventional slow speed techniques known in the prior art.

Accordingly, it is an object of this invention to provide means for rearranging data in a data handling system.

Another object of the invention is to provide a superconductive matrix for permuting a plurality of inputs to a plurality of outputs.

A further object of the invention is the provision of a high speed switching matrix employing superconductive components arranged to switch selectively a plurality of inputs to a predetermined output pattern under the control of appropriate control circuitry.

In accordance with the invention a single output matrix includes a first set of conductors having a plurality of input information channels. A second set of conductors is disposed in crossover relationship to the first set of conductors and the conductors of this second set are grouped with corresponding conductors in each group connected in parallel to form a single output channel. A set of control conductors is disposed in crossover relationship to the second set of conductors, and cryotron elements are located at selected crossover points of all conductors. Currents in the input information channels, together with currents in the control conductors, cause the cryotron elements in the rectangular array formed by the crossing conductors to block all except a desired output path. By grouping together a plurality of these rectangular arrays with the input information channel conductors forming the first set of conductors for each array, a matrix with any desired number of outputs may be obtained.

The foregoing and other objects, features and advantages of the invention will be apparent from the following more particular description of a preferred embodiment of the invention, as illustrated in the accompanying drawings, in which:

FIGURES 1*a* and 1*b* are diagrammatic illustrations of a cryotron element;

Figure 1A:
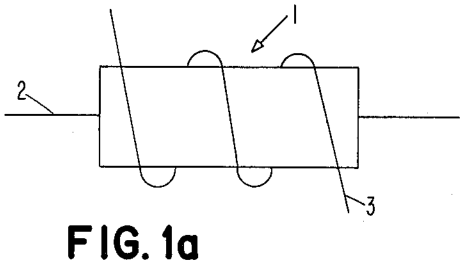

The matrix of the present invention utilizes the superconductive properties of metals and employs cryotrons, such as illustrated in FIGURE 1*a*, as circuit components. The cryotron 1 has a control winding 3 and a gate line 2. The gate line of the cryotron is constructed of a material which is in a superconductive state at the operating temperature of the cryotron, in the absence of a magnetic field. The gate line is driven resistive (non-superconducting or normal condition) by a magnetic field produced when a current greater than a pre-determined minimum exists in its control winding 3. Thus, the cryotron utilizes the fact that the superconductive transition of a material depends upon both temperature and the applied electromagnetic field. The inherent characteristics of such a device enable it to perform switching and inhibiting functions which are readily adaptable to computer applications.

The cryotron 1 may be constructed of any suitable material having the required operating characteristics. The gate line must have the property of transferring from its superconductive to its normal state under the influence of a magnetic field and the material tin has been found to be satisfactory for this application. The control winding 3 and the connections between the various components of associated circuitry (not shown) must be fabricated from a superconductor material which remains in its superconductive state under all conditions of circuit operation. An example of such a material is lead. The construction of the cryotron in wire wound form, together with the types of materials employed, may be understood more readily by referring to the article by Dudley A. Buck, "The Cryotron—A Superconductive Computer Component," Proceedings of the I.R.E., pages 482 to 493, April 1956. Cryotrons may also be constructed in thin film form as illustrated, for example, in copending application Serial No. 625,512, filed November 30, 1956 in behalf of R. L. Garwin.

Figure 1B:
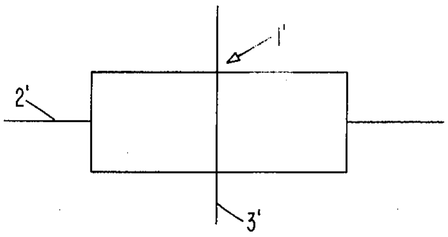

In order to further simplify the showing of cryotron devices, the diagrammatic illustration in FIGURE 1*b* will be used throughout this application. In this figure elements corresponding to those of FIGURE 1*a* are designated with a prime notation.

Figure 2:
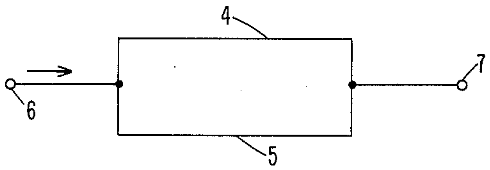
FIGURE 2 is a diagrammatic showing of a superconducting wire pair utilized in the present invention.
Figure 7:
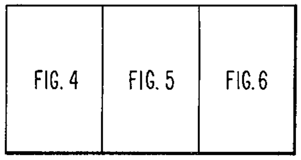
FIGURE 7 is a diagrammatic showing of how FIGURES 4 to 6 fit together to form a composite illustration.

The device of the present invention employs cryotrons as inhibitor elements to switch persistent currents along selected paths in a conductive network. The basic concept may be thought of as the indication of a function value by current in one of two wires. A pair of these wires is shown in FIGURE 2 of the drawings. These wires 4 and 5 are superconductors, and a current initiating at terminal 6 may exist in either wire 4 or wire 5, but not both. This is accomplished by controlling the conductivity of these wires by inhibitors such as the cryotron devices illustrated in FIGURES 1*a* and 1*b*. Thus, there is always current between points 6 and 7, but this current may be selectively diverted through either conductor 4 or 5.

Figure 3:
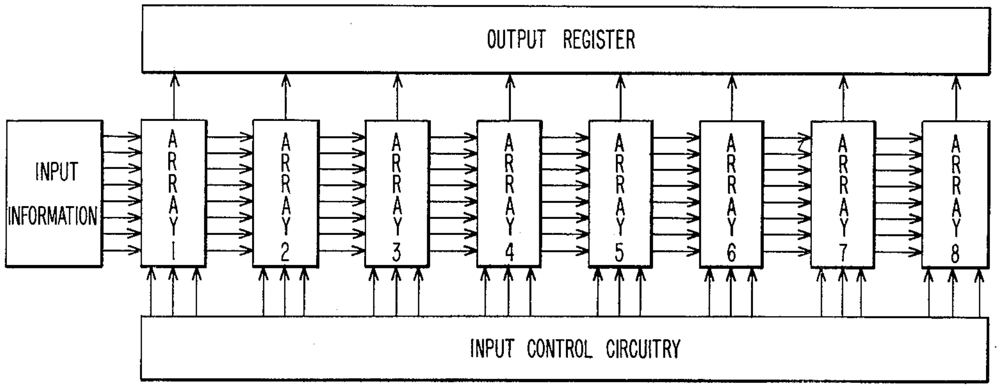
FIGURE 3 is a block diagram of a permutation matrix system constructed in accordance with the principles of the present invention.

FIGURE 3 is a block diagram of a system constructed in accordance with the invention. In this diagram input information is fed into eight rectangular arrays which are appropriately controlled by input control circuitry to rearrange the input information in any desired sequence as it is fed into the output register. The information in the output register may be in the same order as the input information, in reverse order (turned end-for-end), rearranged in any desired sequence, or selected inputs may appear at one or more of the outputs.

Figure 4:
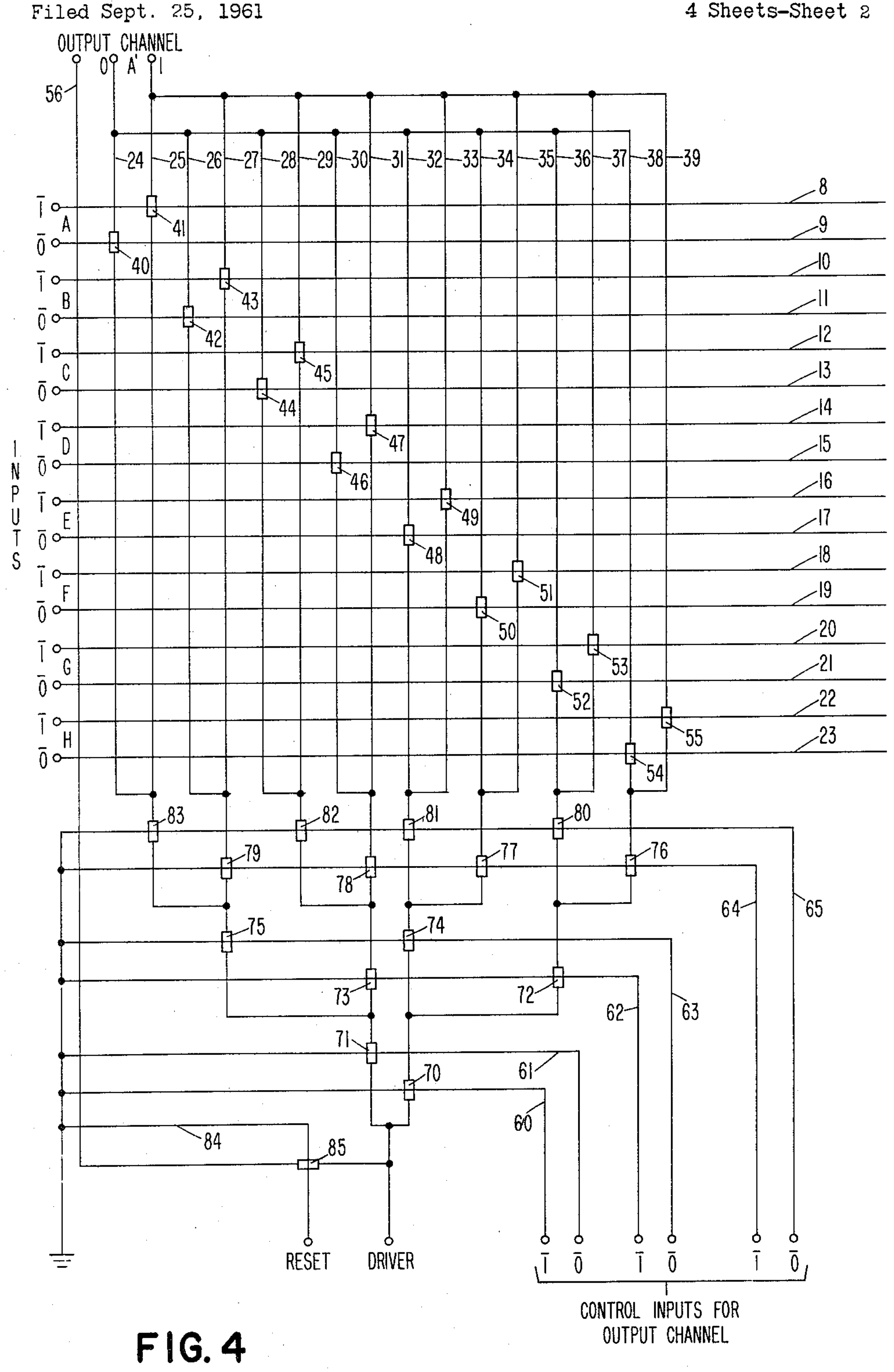
FIGURES 4 to 6 are detailed showings of the matrix construction of the present invention.
Figure 5:
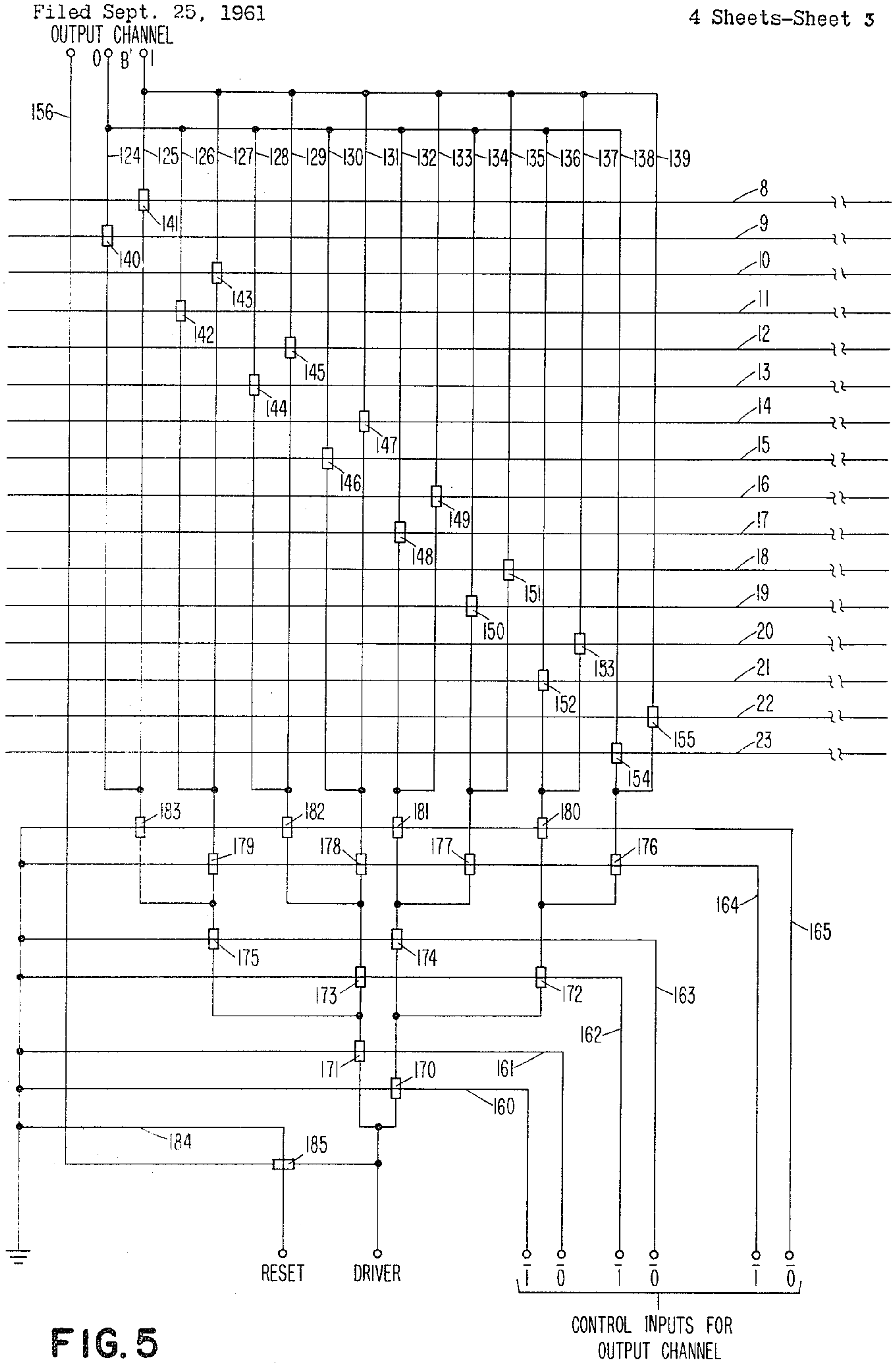
Figure 6:
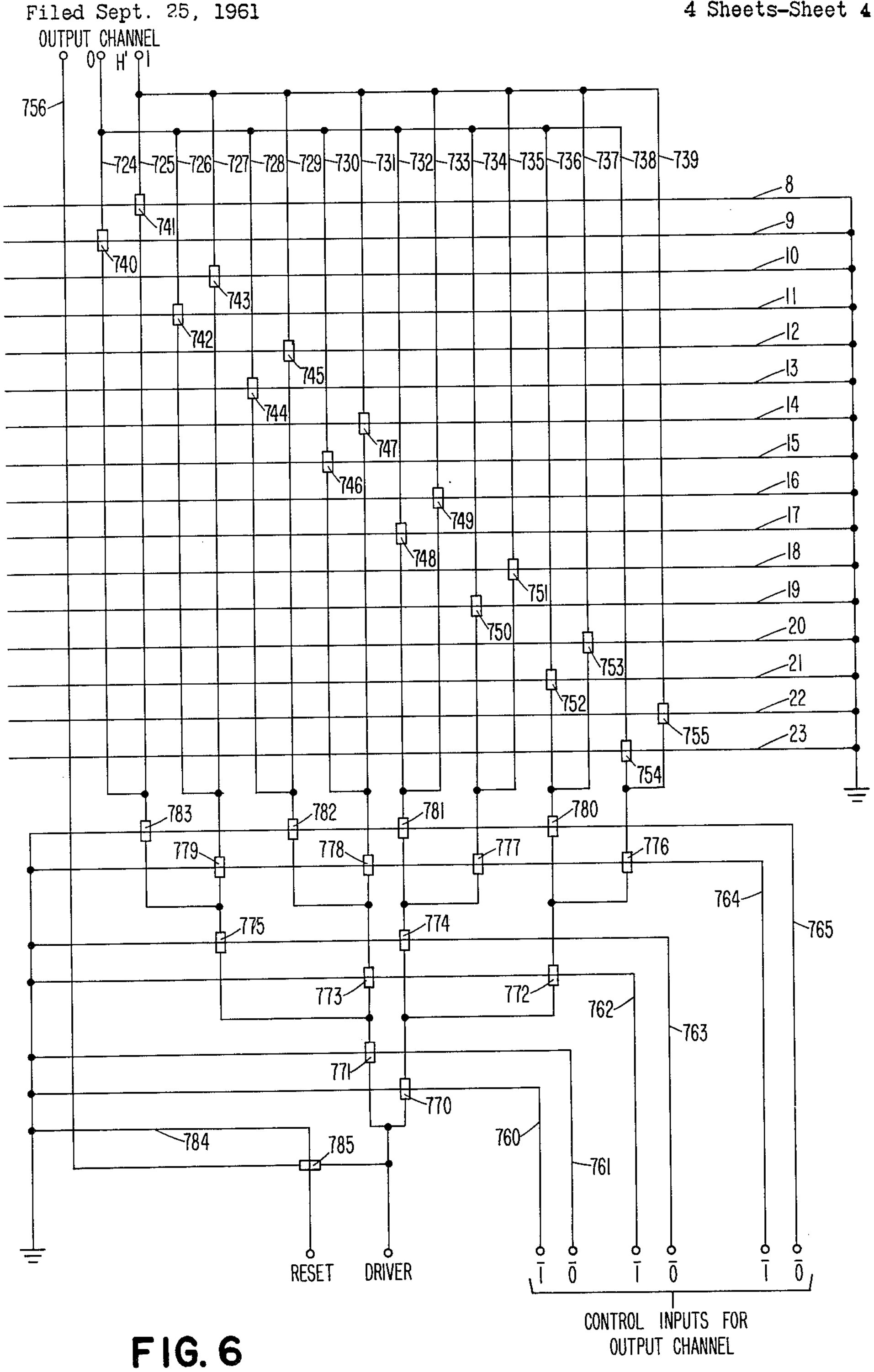

FIGURES 4 to 6 are detailed showings of the circuitry utilized in the system of FIGURE 3. In these detailed showings arrays 1, 2 and 8 of FIGURE 3 are shown in FIGURES 4, 5 and 6, respectively. Since all of the arrays are identically constructed, arrays 3 to 7 are not shown in the detailed drawings. Although the example taken for illustration utilizes an 8 by 8 array, it will be appreciated that the invention is applicable to arrays of any size.

The composite showing of FIGURES 4 to 6 is an 8 by 8 cryogenic permutation matrix having input channels A through H and output channels A′ through H′ with output channels C′ through G′ being omitted for simplicity of illustration. The composite array includes a first set of conductors labeled 8 through 23, adjacent pairs of which form input channels A through H, respectively. In FIGURE 4 a second set of conductors 24 through 39 is disposed in crossover relationship to conductors 8 through 23 to form a rectangular array of conductors. Cryotron elements 40 through 55 are disposed at selected intersections of the first and second sets of conductors. The cryotron elements 40 through 55 comprise control windings in series with conductors 8 through 23 and gate lines in series with conductors 24 through 39. Conductors 24, 26, 28, 30, 32, 34, 36 and 38 are connected in parallel at their upper ends to form the 0 output of output channel A′. Conductors 25, 27, 29, 31, 33, 35, 37 and 39 are connected together in parallel at their upper ends to form the 1 output of output channel A′. The lower end of conductors 24 through 39 are connected together in parallel in the fashion shown to be energized from the driver terminal. Control lines 60 to 65 are disposed in crossover relationship with the parallel connection network at the lower ends of conductors 24 through 39. Cryotron elements 70 through 83 are disposed along conductors 60 to 65 to permit control of the current applied at the driver terminal. Cryotron elements 70 through 83 comprise control windings in series with control lines 60 to 65 and gate lines in series with the conductors of the parallel connection network. A reset line 84 controls cryotron 85 to divert current from line 56, which is energized when both lines of output channel A′ are blocked.

A convenient way of constructing the rectangular array circuits utilized in the present invention is by vapor deposition or printed circuit techniques. If the construction technique employed is that of vapor deposition, the conductive lines are laid down upon a dielectric plate or substrate such as glass. A high degree of miniaturization is possible with this process. It will be appreciated that this circuitry is quite simple and economical.

The remainder of the arrays are duplicates of the array described in connection with FIGURE 4, and corresponding parts in the remaining arrays are denoted by the same order in numbers with different prefix digits.

Each of input channels A through H can exhibit three conditions. Current on line 9, which is designated a $\bar{0}$, indicates a value of 1 on channel A with which it is associated. Current on line 8 indicates a value of 0 on channel A. Currents on both lines 8 and 9 associated with input channel A indicates a disconnected state. Each of the output channels A′ through H′ can similarly exhibit three conditions. As shown in FIGURE 4 the output may be 0 or 1 when the lines so labeled are energized, or the output may be disconnected when there is current on line 56, which serves as the alternate path for the driver current.

In order to illustrate the operation of the matrix the following examples of information passing through the matrix will be described in detail. For each of these examples it will be assumed that the input information is 01000110 represented by currents on input lines 8, 11, 12, 14, 16, 19, 21 and 22, respectively.

EXAMPLE 1

| Input: | Output |
|---|---|
| A | A′ |
| B | B′ |
| C | C′ |
| D | D′ |
| E | E′ |
| F | F′ |
| G | G′ |
| H | H′ |

EXAMPLE 2

| Input: | Output |
|---|---|
| A | disconnected |
| B | disconnected |
| C | disconnected |
| D | A′ |
| E | B′ |
| F | H′ |
| G | disconnected |
| H | disconnected |

EXAMPLE 3

| Input: | Output |
|---|---|
| A | A′ |
| B | B′ |
| C | C′ |
| D | D′ |
| E | F′ |
| F | G′ |
| G | H′ |
| H | disconnected |

EXAMPLE 4

| Input: | Output |
|---|---|
| A | A′ |
| B | B′ |
| C | D′ |
| D | C′ |
| E | E′ |
| F | F′ |
| G | H′ |
| H | G′ |

EXAMPLE 5

| Input: | Output |
|---|---|
| A | A′ |
| | B′ |
| | C′ |
| B | D′ |
| | E′ |
| C | F′ |
| D | G′ |
| E | H′ |
| F | -- |
| G | -- |
| H | -- |

The table below is illustrative of a code arrangement for energizing the control inputs to effect the transfer of information from input to output.

*Control input energization*

| Input channel | Line 60 $\bar{1}$ | Line 61 $\bar{0}$ | Line 62 $\bar{1}$ | Line 63 $\bar{0}$ | Line 64 $\bar{1}$ | Line 65 $\bar{0}$ |
|---|---|---|---|---|---|---|
| A | X | ------ | X | ------ | X | ------ |
| B | X | ------ | X | ------ | ------ | X |
| C | X | ------ | ------ | X | X | ------ |
| D | X | ------ | ------ | X | ------ | X |
| E | ------ | X | X | ------ | X | ------ |
| F | ------ | X | X | ------ | ------ | X |
| G | ------ | X | ------ | X | X | ------ |
| H | ------ | X | ------ | X | ------ | X |

EXAMPLE 1

In this instance it is desired to transfer the input information to the output without disturbing the order of the information. In order to transfer the current on input line 8, representing a 0, to the 0 output of channel A′, it will be seen from the table that it is necessary to energize control input lines 60, 62, and 64. Current in line 60 will drive cryotron 70 resistive and force current from the driver terminal through cryotron 71 which is in its superconductive state. Current in control input line 62 will drive resistive cryotron 73, thereby diverting the current through cryotron 75. Current in control input line 64 will drive resistive cryotron 79, thereby diverting the current through cryotron 83, and since input line 8 has driven resistive cryotron 41, the current from the driver terminal will exit through line 24 giving a 0 output on output channel A′.

The current on input line 11, representing a 1 on channel B is transferred to output channel B′ by energizing control input lines 160, 162 and 165. Current applied to control input line 160 will drive resistive cryotron 170, thereby forcing the current from the driver terminal through cryotron 171 which is in its superconductive state. Current on control input line 162 drives resistive cryotron 173, thus forcing the current from the driver terminal through cryotron 175. The current applied to line 165 of the control input drives resistive cryotron 183 and thereby forces the current from the driver terminal through cryotron 179, and since the current in line 11 has driven resistive cryotron 142, the current from the driver terminal source exits through cryotron 143 on line 127 to the 1 output terminal of output channel B′.

The output channels for inputs C through G have been omitted to reduce the complexity of the drawings, but the transfer process for these inputs would be the same as those described in connection with channels A and B.

The information on line 22 of information input channel H is transferred to output channel H′ by energizing control input lines 761, 763 and 765. The control current on line 761 drives resistive cryotron 771 and forces current from the driver terminal source through cryotron 770, which is in its superconductive state. Current on control line 763 drives resistive cryotron 774 and diverts the current through cryotron 772. Current on control line 765 drives resistive cryotron 780 and diverts the current from the driver terminal source through cryotron 776. Since line 22 of information input channel H has driven resistive cryotron 755 the current from the driver terminal source exits through cryotron 754 on line 738 to energize the 0 output of output channel H′. The information transfer is now complete and the inputs A through H appear on output lines A′ through H′, respectively.

EXAMPLE 2

Let it now be assumed that it is desired to rearrange the input data so that the inputs on channels D, E and F appear on output channels A′, B′ and H′, respectively. Input channels A, B, C, G and H are not being considered because of the fact that output channels C′, D′, D′, F′ and G′ are disconnected and are not shown on the detailed drawing for the sake of simplicity.

To transfer the 0 indication on line 14 of input channel D to output channel A′ the control input lines 60, 63 and 65 are energized. The current on line 60 drives resistive cryotron 70 and forces the current from the driver source terminal through cryotron 71. The current on control line 63 drives resistive cryotron 75, thereby diverting the current through cryotron 73 which is in its superconducting state. Cryotron 82 is driven resistive by the control current on control line 65, and the current from the driver source terminal is diverted through cryotron 78. Since input line 14 is energized, cryotron 47 is in its resistive state, and therefore, the current from the driver source terminal must exit through cryotron 46 on line 30 to the 0 output of output channel A′.

The transfer of the 0 indication on line 16 of input channel E is accomplished by energizing lines 161, 162 and 164. Current on control line 161 drives resistive cryotron 71 and diverts the driver current from the driver source terminal through cryotron 170 which remains in its superconductive state. The current on control line 162 drives resistive cryotron 172, thereby diverting the driver source current through cryotron 174. Cryotron 177 is driven resistive by the current on control line 164, and the current from the driver source terminal is forced through cryotron 181. Since cryotron 149 is in its resistive state because of current on line 16, the driver source current exits through cryotron 148 on line 132 to energize the 0 line of output channel B′.

In order to transfer the input information on input channel F to output channel H′ the control input lines 761, 762 and 765 must be energized. Current on control line 761 drives resistive cryotron 771 and diverts the driver source current through cryotron 770. Current on control line 762 drives resistive cryotron 772 and forces the driver source current through cryotron 774. Cryotron 781 is driven resistive by the control current on line 765, and the current from the driver source terminal is diverted through cryotron 777. The input current on line 19 of channel F drives resistive cryotron 750 on line 734, and the current from the driver source terminal must exit through cryotron 751 on line 735 to energize the 1 output line of output channel H′. Thus, the information on input channels D, E and F now appears on output channels A′, B′ and H′, respectively.

EXAMPLE 3

Let it now be assumed that the input information on lines 8, through 23 is to be rearranged by the matrices to appear on the output channels in the order listed in the table of Example 3. Since the detailed steps of energizing the control circuitry to cause a given input to appear on a given output channel have already been discussed, it is not believed to be necessary to follow this detailed procedure through for the remaining examples.

To transfer the input information on input channel A to output channel A′, control lines 60, 62 and 64 are energized. The information on input channel B is transferred to output channel B′ by energizing control lines 160, 162 and 165. Output channels C′ through G′ and their associated control circuitry have not been shown in order to simplify the drawings. However, since a uniform numbering pattern has been employed throughout the drawings, it will be seen easily from the control input energization table that the information on input channel C may be transferred to output channel C′ (not shown). This pattern may be observed from any of FIGURES 4, 5 and 6, which contain identical cryotron circuits with a slightly modified numbering system.

Similarly, the input information on channel D may be transferred to output channel D′; the input information on channel E may be transferred to channel F′; the input information on channel F may be transferred to channel G′; and the input information on channel G may be transferred to channel H′. The input information on input channel H is not utilized, and output channel E′ (not shown) exhibits a disconnected state indication. From this example it will be seen that the matrix of the present invention will permit the elimination of a given bit of information from a group of bits being processed.

EXAMPLE 4

In this example the data bits appearing on input channels A through H are passed through the matrices with the third and fourth and the seventh and eight bits being transposed. To accomplish this control circuitry of output channels A′, B′, D′ and F′ is energized to transfer the input information from channels A, B, E and F, respectively. However, the control circuitry of output channel C′ is energized to switch the input information from input channel D, and the control circuitry of output channel D′ is energized to switch the input information from channel C. Similarly, the control circuitry of output channel G′ is energized to switch the input information from input channel H, and the control circuitry of output channel H′ is energized to switch the input information from input channel G. In this fashion the information on channels C and D and channels G and H is transposed as the data is processed through the matrices.

EXAMPLE 5

In this example it will be seen that the information on a given input channel may be switched to appear simultaneously on a plurality of output channels. The control circuitry of output channels A′, B′ and C′ is energized to switch the input information from input channel A to appear simultaneously on all three of these output channels. Similarly the control circuitry of output channels D′ and E′ is energized to switch simultaneously the input information from input channel B to appear on both of these output channels. The control circuitry of output channels F′, G′ and H′ is energized to switch the input information from input channels C, D and E, respectively, to appear on these outputs. The information appearing on input channels F, G and H is not utilized.

It will be appreciated from the examples given that the individual control utilized with each array will permit input data to be transferred to the output register in the same order in which it is received, in reverse order, rearranged in any desired order, or one or more inputs may be transferred to one or more outputs as desired. When any input to the matrix indicates a disconnected state (that is, current on both input lines) the output also indicates a disconnected state by the energizing of line 56 (FIGURE 4). For example, assume that the information on channel H is to be transferred to output channel A′, and that the H channel is in its disconnected state with current appearing on both lines 22 and 23. Control lines 61, 63 and 65 are energized, and cryotrons 71, 74 and 80 will be driven resistive to divert the driver source current through cryotrons 70, 72 and 76 to appear at the junction of lines 38 and 39. Since both input lines 22 and 23 are carrying current cryotrons 54 and 55 are resistive. The current from the driver source is therefore blocked, and cannot exit through the array and must exit through cryotron 85 and alternate path 56. Line 56 is the output indication of the disconnected state. By energizing the reset line 84, cryotron 85 is driven resistive and the array is reset for subsequent operation. The reset lines of the arrays are energized prior to each transfer operation to assure that the array is conditioned.

It will be noted also that when any one or more of the control inputs has a disconnected state indication (that is, current on both lines) the output channel will indicate a disconnected state. For example, it is seen readily from FIGURE 4 that currents on control lines 60 and 61 completely block the driver current path through the array by driving resistive cryotrons 70 and 71. Similarly control currents on lines 62 and 63 block the array by driving resistive cryotrons 72 through 75. In like fashion control currents on lines 64 and 65 block the array by driving resistive cryotrons 76 through 83. In each of the three examples mentioned the only alternate path for the driver current is through cryotron 85 and line 56 to give a disconnected indication at output channel A′.

The information input and control input channels have been illustrated with pairs of conductors so that the disconnected condition must be indicated by currents in both conductors. The output channel has been illustrated with three conductors, with the disconnected state being indicated by a current in the third conductor. It will be appreciated that a three conductor system could be used for the information and control input channels, but the arrangement shown is the most economical in terms of hardware components.

While the invention has been shown and described with particular reference to a preferred embodiment, it will be understood by those skilled in the art that various changes in form and details may be made without departing from the spirit and scope of the invention.

What is claimed is:

1. A cryogenic permutation matrix comprising
a set of first conductors,
said set of first conductors being adapted to carry information in the form of electrical currents from a plurality of input information channels,
a set of second conductors,
said set of second conductors being disposed in crossover relationship with said set of first conductors and comprising groups having corresponding conductors connected in parallel to form a single output channel,
a set of third conductors,
said set of third conductors being disposed in crossover relationship with said set of second conductors,
a plurality of cryotron elements disposed at selected crossover points of said sets of conductors,
means to apply input information to set set of first conductors,
means to apply a driver current to said set of second conductors, and
means to apply selective control currents to said set of third conductors,
whereby currents in said third conductors produce on said output channel the information appearing on any selected input channel.

2. The combination according to claim 1 comprising an alternate path conductor in parallel with said set of second conductors for providing additional output information in the event that no current paths exist in said set of second conductors.

3. A cryogenic permutation matrix comprising
a set of first conductors,
said set of first conductors being adapted to carry information in the form of electrical currents from a plurality of input information channels,
a plurality of sets of second conductors,
said plurality of sets of second conductors being disposed in crossover relationship with said set of first conductors and comprising groups having corresponding conductors connected in parallel to form a plurality of output channels,
a plurality of sets of third conductors,
each of said sets of third conductors being disposed in crossover relationship with a set of second conductors,
a plurality of cryotron elements disposed at selected crossover points of said sets of conductors,
means to apply input information to said set of first conductors,
means to apply a driver current to each of said sets of second conductors, and
means to apply selective control currents to each of said sets of third conductors,
whereby currents in said third conductors produce on any given output channel the information appearing on any selected input channel.

4. The combination according to claim 3 comprising an alternate path conductor in parallel with each of said sets of second conductors for providing additional output information in the event that no current paths exist in said set of second conductors.

References Cited by the Examiner

UNITED STATES PATENTS

| | | | |
|---|---|---|---|
| 2,844,811 | 7/1958 | Burkhart | 340—147 |
| 2,853,693 | 9/1958 | Lindenblad | 340—147 |
| 2,958,848 | 11/1960 | Garwin | 340—166 |
| 2,965,887 | 12/1960 | Yostpille | 340—176 |
| 3,019,349 | 1/1962 | Sanborn | 340—173.1 |
| 3,047,230 | 7/1962 | Anderson | 340—173.1 |
| 3,047,840 | 7/1962 | Harms et al. | 340—166 |

NEIL C. READ, *Primary Examiner.*